US008144181B2

(12) United States Patent  (10) Patent No.: US 8,144,181 B2
Gladstone  (45) Date of Patent: Mar. 27, 2012

(54) AD HOC TELEPRESENCE MANAGER (75) Inventor: Philip Gladstone, Carlisle, MA (US)

(73) Assignee: Cisco Technology, Inc., San Jose, CA (US)

( * ) Notice: Subject to any disclaimer, the term of this patent is extended or adjusted under 35 U.S.C. 154(b) by 958 days.

(21) Appl. No.: 12/138,247

(22) Filed: Jun. 12, 2008

(65) Prior Publication Data

US 2009/0309955 A1 Dec. 17, 2009

(51) Int. Cl.
*H04N 7/14* (2006.01)
(52) U.S. Cl. .................. 348/14.04; 348/14.08
(58) Field of Classification Search ............. 348/14.01, 348/14.02, 14.04, 14.05, 14.08; 379/265.02, 379/265.11; 370/260, 261, 262; 709/204
See application file for complete search history.

(56) References Cited

U.S. PATENT DOCUMENTS

2005/0267826 A1* 12/2005 Levy et al. ............... 705/34
2007/0186002 A1* 8/2007 Campbell et al. ......... 709/231
2007/0233785 A1* 10/2007 Abraham et al. .......... 709/204

* cited by examiner

*Primary Examiner* — Tuan Nguyen
(74) *Attorney, Agent, or Firm* — Merchant & Gould (57) ABSTRACT In one embodiment, a method for managing ad hoc telepresence sessions is described. The method includes sensing a presence of a user in an ad hoc telepresence zone. The method also includes managing a list of contacts associated with the user. The method also includes determining an availability of a remote user at a remote telepresence zone. The remote user is selected from the list of contacts associated with the user. The method also includes displaying a list of available remote users. The method also includes initiating a telepresence session between the user and the remote user according to an input from the user to select the remote user from the list of available users.

20 Claims, 8 Drawing Sheets

AD HOC TELEPRESENCE MANAGER

TECHNICAL FIELD

The present disclosure relates generally to video conferencing.

BACKGROUND

Organizations are becoming more distributed and the individual teams that work together are more geographically dispersed. However, much creativity and problem solving happens when members of a team, or even of related teams, meet in ad hoc environments such as hallway conversations and discuss ongoing issues. These ad hoc meetings are infrequent, if they happen at all, when the participants are not physically near each other. While conventional telepresence and desktop video conferencing is used for more formal interactions, conventional uses of these technologies do not facilitate spontaneous, ad hoc interactions.

OVERVIEW

Embodiments of an apparatus are described. In one embodiment, the apparatus is an apparatus to manage ad hoc telepresence sessions. The apparatus includes a presence sensor to sense a presence of a user in an ad hoc telepresence zone. The apparatus also includes a contacts manager coupled to the presence sensor in certain embodiments. The contacts manager manages a list of contacts associated with the user. In one embodiment, the apparatus includes an ad hoc telepresence manager coupled to the contacts manager. The ad hoc telepresence manager determines an availability of a remote user selected from the list of contacts associated with the user. In some embodiments, the ad hoc telepresence manager initiates a telepresence session between the user and the remote user in response to determining that the remote user is available. Other embodiments of the apparatus are also described.

Embodiments of a method are also described. In one embodiment, the method is a method for managing ad hoc telepresence sessions. The method, in one embodiment, includes sensing a presence of a user in an ad hoc telepresence zone. The method also includes managing a list of contacts associated with the user. In certain embodiments, the method includes determining an availability of a remote user at a remote telepresence zone. The remote user is selected from the list of contacts associated with the user. The method also includes displaying a list of available remote users. In one embodiment, the method includes receiving an input from the user. The input selects the remote user from the list of available remote users. In a further embodiment, the method includes initiating a telepresence session between the user and the remote user in response to receiving the input from the user. Other embodiments of the method are also described.

Other embodiments will become apparent from the following detailed description, taken in conjunction with the accompanying drawings, illustrated by way of example.

BRIEF DESCRIPTION OF THE DRAWINGS

Throughout the description, similar reference numbers may be used to identify similar elements.

DESCRIPTION OF EXAMPLE EMBODIMENTS

Figure 1:
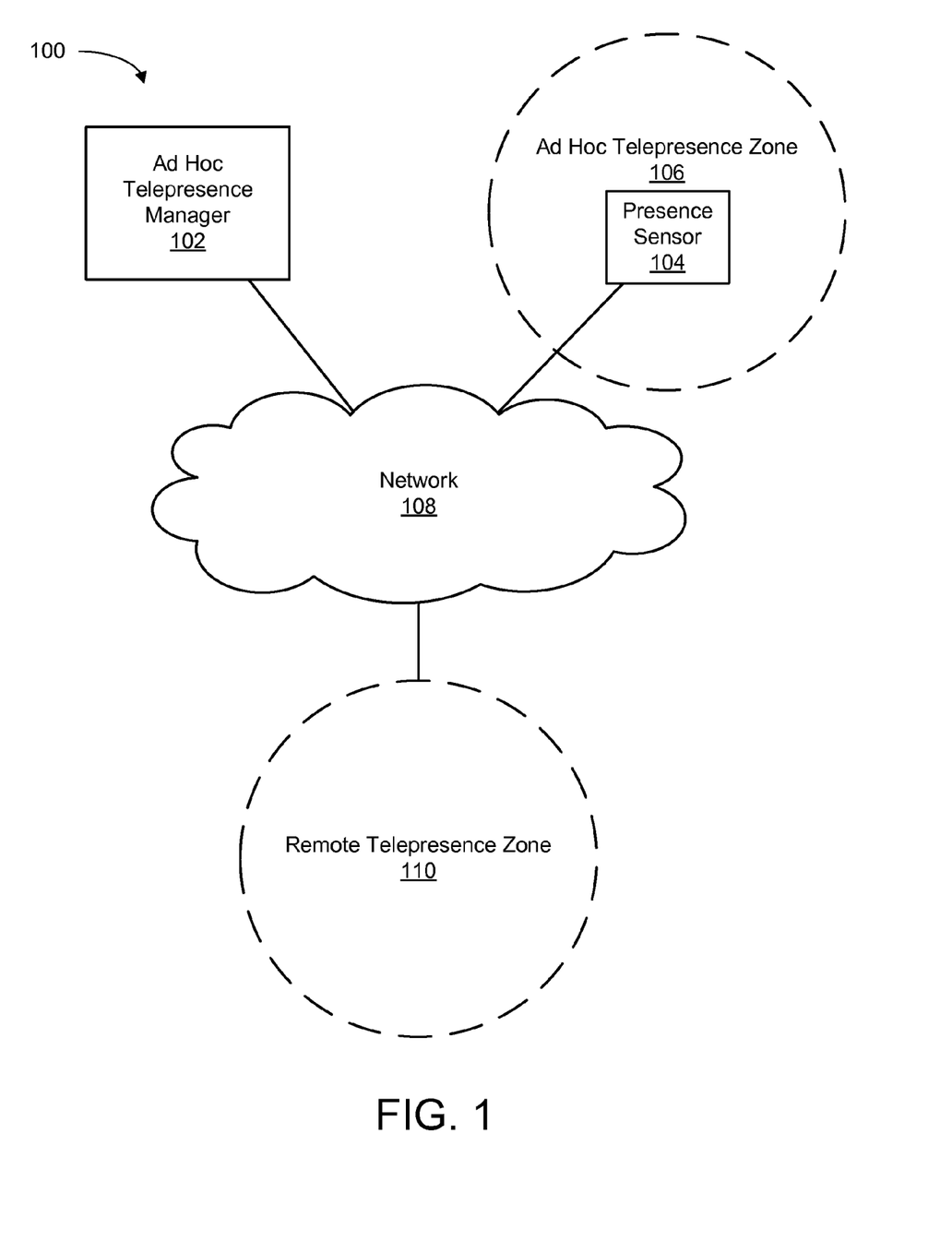
FIG. 1 depicts a schematic diagram of one embodiment of an ad hoc telepresence system.

FIG. 1 illustrates a schematic diagram of one embodiment of an ad hoc telepresence system 100. The ad hoc telepresence system 100, in this embodiment, includes an ad hoc telepresence manager 102 and a presence sensor 104. The ad hoc telepresence system 100 initiates an ad hoc telepresence session between a user and an associated contact. In this way, the ad hoc telepresence system 100 may provide for impromptu interactions with known contacts. Alternatively, the ad hoc telepresence system 100 may facilitate spontaneous interactions among otherwise unknown people.

The ad hoc telepresence manager 102, in one embodiment, determines the presence of a user in an ad hoc telepresence zone 106. In response to the presence of the user, the ad hoc telepresence manager 102 accesses a list of contacts associated with the user. In certain embodiments, the ad hoc telepresence manager 102 determines an availability of a contact from the list of contacts associated with the user and initiates a telepresence session between the user and the contact. In one embodiment, the ad hoc telepresence manager 102 determines the availability of the contact in a remote telepresence zone 110.

In some embodiments, the ad hoc telepresence manager 102 determines the availability of a plurality of contacts from the list of contacts associated with the user, the available contacts forming a subset of the contacts on the list of contacts. The ad hoc telepresence manager 102 may initiate a telepresence session with at least one of the contacts within the subset of available contacts. For example, the ad hoc telepresence manager 102 may determine that three contacts from the contact list are available, and initiate telepresence sessions between the user and each of the three available contacts.

In one embodiment, the ad hoc telepresence manager 102 is connected to a telepresence unit (refer to FIG. 5) that is connected through a network 108 to a remote telepresence unit (refer to FIG. 6) at the remote telepresence zone 110. In general, the telepresence unit provides audio and/or video communications with the remote telepresence unit. Telepresence units have the effect of giving the impression that a user at the remote telepresence unit is present at the telepresence unit. Examples of telepresence units include a Cisco TelePresence 1000™, a Polycom RPX™ HD, and an HP Halo system.

In certain embodiments, the ad hoc telepresence manager 102 is connected to the telepresence unit through the network 108. In another embodiment, the ad hoc telepresence manager 102 is connected directly to the telepresence unit. In an alternative embodiment, the telepresence manager 102 is integrated with the telepresence unit in a single physical device.

In one embodiment, the presence sensor 104 senses the presence of the user in the ad hoc telepresence zone 106. The presence sensor 104, in one embodiment, senses the presence of the user by communicating wirelessly with a wireless device (not shown) carried by the user. For example, the presence sensor 104 may be a Wi-Fi access point, and the wireless device may be a Wi-Fi enabled device, such as a personal digital assistant (PDA).

In certain embodiments, the presence sensor 104 has a range that defines the ad hoc telepresence zone 106. For example, the presence sensor 104 may be a Bluetooth™ device, and the wireless device may be a Bluetooth™ enabled cellular phone carried by the user. In this example, the Bluetooth™ device of the presence sensor 104 has a communication range within which the presence sensor 104 communicates with the cellular phone. The ad hoc telepresence manager 102 determines that the user is present when the presence sensor 104 communicates with the cellular phone of the user.

In another embodiment, the presence sensor 104 has a range that is tuned to control the size of the ad hoc telepresence zone 106. For example, the presence sensor 104 may be a radio frequency identification (RFID) reader, and the wireless device may be an RFID device in a badge carried by the user. In this example, a transmitter of the RFID reader may have a variable transmission power, with a higher transmission power increasing the range within which the RFID reader communicates with the RFID device. In this example, the size of the ad hoc telepresence zone 106 is correlated with the transmission power of the presence sensor 104.

In certain embodiments, the availability of the remote user, or contact, is determined by the presence of the user in the remote telepresence zone 110. Presence may be determined using similar methods to those described above in relation to presence within the ad hoc telepresence zone 106. In one embodiment, the remote telepresence zone 110 includes a presence sensor 104 and operates as a second ad hoc telepresence zone. In certain embodiments, the presence of a user may be modified by additional inputs, such as a presence status or some electronic activity. For example, if the user is on the phone, the user may be deemed "unavailable" even though the presence sensor detects the presence of the user.

In an alternative embodiment, availability of the contact is determined by a sign-in status. For example, the ad hoc telepresence manager 102 may determine that the contact is available in response to the contact being signed in at a computer (not shown) with a camera and/or a microphone. Other examples include the user's status on the personal computer using keyboard and/or mouse activity, and facial recognition systems.

The system 100, in another embodiment, may be used with any audio and/or video communication system. For example, the presence sensor 104 may detect the presence of a user in an ad hoc audio communication zone (not shown). If the user is present, an ad hoc audio communication manager (not shown) may initiate an audio communication session between the user and a remote user.

In another example, the presence sensor 104 may detect the presence of a user in an ad hoc video conferencing zone (not shown). If the user is present, an ad hoc video conferencing manager (not shown) may initiate a video conferencing session between the user and a remote user.

Figure 2:
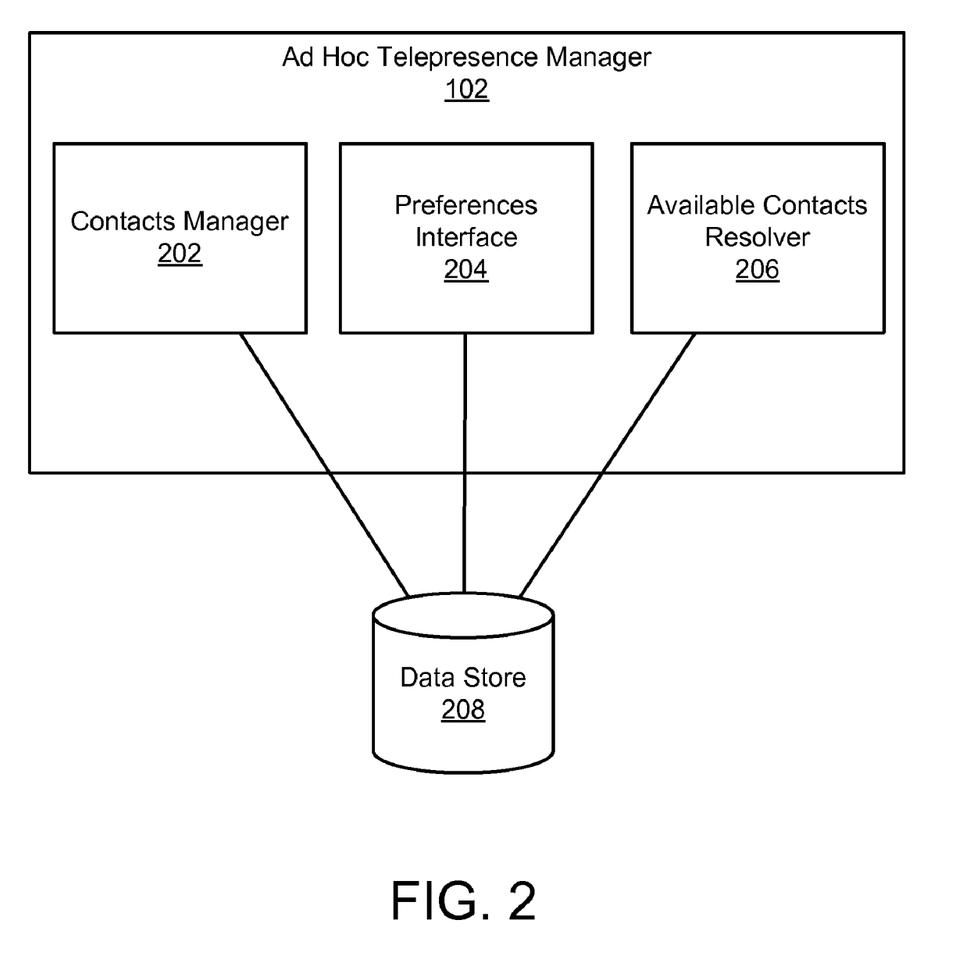
FIG. 2 depicts a schematic diagram of one embodiment of the ad hoc telepresence manager of FIG. 1.

FIG. 2 illustrates a schematic diagram of one embodiment of the ad hoc telepresence manager 102 of FIG. 1. In the illustrated embodiment, the ad hoc telepresence manager 102 includes a contacts manager 202, a preferences interface 204, and an available contacts resolver 206. In some embodiments, the ad hoc telepresence manager 102 determines a group of contacts associated with a user and determines the availability of a contact from the group of contacts.

The contacts manager 202, in one embodiment, manages a list of contacts associated with a user. In one embodiment, the contacts manager 202 is coupled to a data store 208, which stores data describing the contact list for one or more users. In certain embodiments, the contacts manager 202 manages a plurality of lists of contacts for a user. In another embodiment, the contacts manager 202 manages lists of contacts for each of a plurality of users. In certain embodiments, an interface (not shown) manages the lists of contacts.

In certain embodiments, the contacts manager 202 is associated with a server (not shown) that manages lists of contacts for a plurality of users. In an alternative embodiment, the contacts manager 202 is associated with a single user. For example, the contacts manager 202 may manage a contact list for a single user. In this example, each individual user may have a dedicated contacts manager 202.

The preferences interface 204 receives input from a user managing contacts in the data store 208, in one embodiment. The preferences interface 204 may be any known type of interface for managing electronically stored data. For example, the preferences interface 204 may be a web interface, an executable application, or another type of interface.

In certain embodiments, the preferences interface 204 receives input from the user to prioritize contacts within the user's contact list. For example, the user may be most interested in having an informal contact with a particular contact within the contact list. The user, in this example, accesses the preferences interface 204 and prioritizes the contact list by placing the particular contact at the head of the list. As a result of the prioritization, in one embodiment the particular contact is displayed first when available. The prioritization of the list, in one embodiment, takes into account many factors, but may include the reason that the contact is on the list and when the most recent communication with the contact was, and the medium of that communication.

In an alternative embodiment, the preferences interface 204 receives input from the user to delete a contact within the contact list. In another embodiment, the preferences interface 204 receives input from the user to add a contact within the contact list.

The preferences manager 204, in one embodiment, receives input from the user to manage how the user appears as a contact in contact lists for other users. In one embodiment, the preferences manager 204 receives input from the user specifying a contact list on which the user should not appear. For example, the user may provide input directing the contacts manager 202 to remove the user from a contact list for a project on which the user is no longer participating.

In one embodiment, the available contacts resolver 206 determines the availability of a contact on the contact list of the user. Availability of a contact is based on the presence of the contact in a remote ad hoc telepresence zone (110) in one embodiment. In another embodiment, availability of a contact is based on a login status of the contact and the settings in the profile of the contact.

Figure 3:
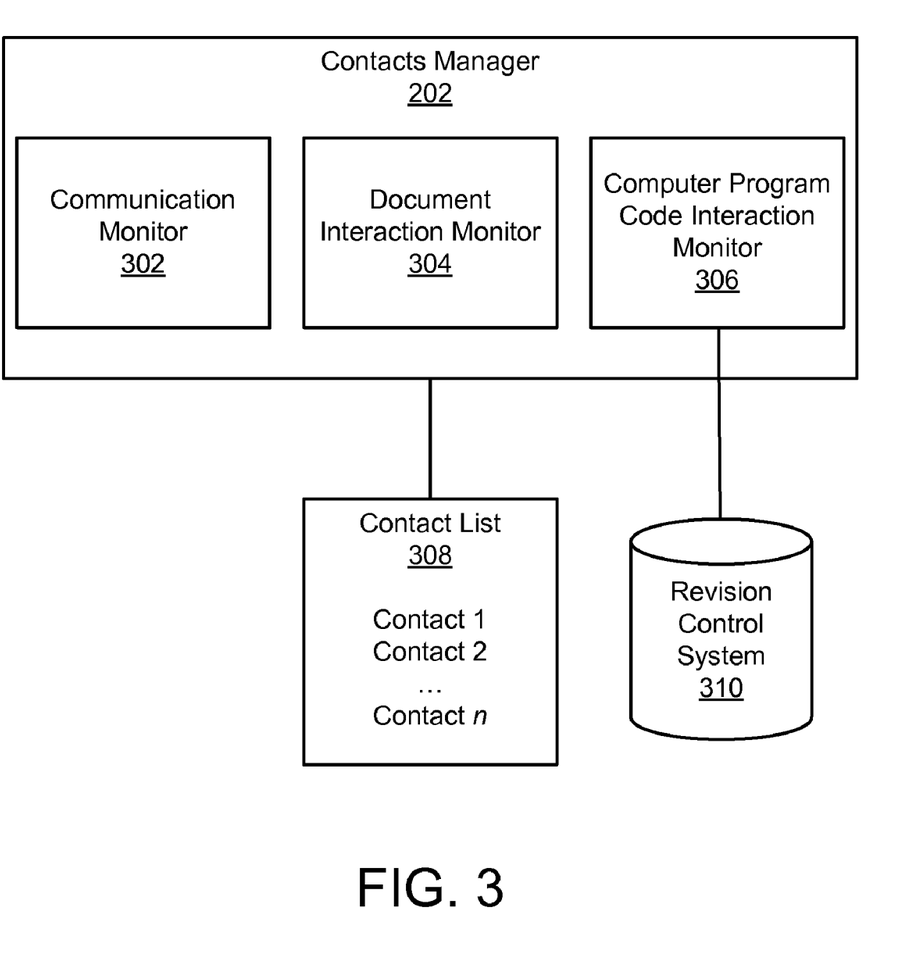
FIG. 3 depicts a schematic drawing of one embodiment of the contacts manager of FIG. 2.

FIG. 3 illustrates a schematic drawing of one embodiment of the contacts manager 202 of FIG. 2. The contacts manager 202 includes a communication monitor 302, a document interaction monitor 304, and a computer program code interaction monitor 306. In some embodiments, the contacts manager 202 adds contacts to a contact list 308 of contacts associated with a user in response to an electronic interaction with the contact.

The communication monitor 302, in one embodiment, monitors electronic communication by the user. Examples of electronic communication include e-mail, text chat, a telephone conversation, a telepresence session, or another type of electronic communication known in the art. In certain embodiments, the communication monitor 302 extracts contact information from the electronic communication and adds the contact information to the contact list 308. The "reason" that the contact is added may also be stored in the contact list. Examples include "27 emails, most recent today (9:11 AM" or "3 documents, last was 'Draft Patent.doc'."

In another example, a user may receive an e-mail from a contact. In this example, the communication monitor 302 extracts the e-mail address of the contact from the e-mail and adds the e-mail address to the contact list 308. The contact manager 302 also may extract additional contact information such as a telepresence identification, an employee number, a serial number, or other contact information for inclusion in the contact list 308.

The document interaction monitor 304, in one embodiment, monitors an interaction by the user with a document. In certain embodiments, the document interaction monitor 304 extracts authorship information from a document accessed by the user and adds an author of the document to the contact list 308. One example of authorship information includes an employee identification number.

For example, the user may access a word processing document that includes embedded data that includes contact information about the author of the document. In this example, the document interaction monitor 304 extracts the contact information from the document and adds the author to the contact list 308.

In one embodiment, the computer program code interaction monitor 306 monitors interaction by the user with computer program code. The computer program code interaction monitor 306, in one embodiment, determines an author of the computer program code and adds the author as a contact to the contact list 308.

In certain embodiments, the computer program code interaction monitor 306 accesses a revision control system 310 to determine authorship of the computer program code. The revision control system 310 includes data describing the authorship of the computer program code. Examples of a revision control system 310 include Concurrent Versions System (CVS), Subversion®, and Aegis.

In certain embodiments, the contact information is added to the contact list 308 in response to an electronic interaction with the contact without further input from the user. In one embodiment, the contact information is added to the contact list 308 in response to an input from the user, such as a confirmation. In another embodiment, the preferences interface 204 receives an input from the user determining how contacts are added to the contact list 308 in response to an electronic interaction.

Figure 4:
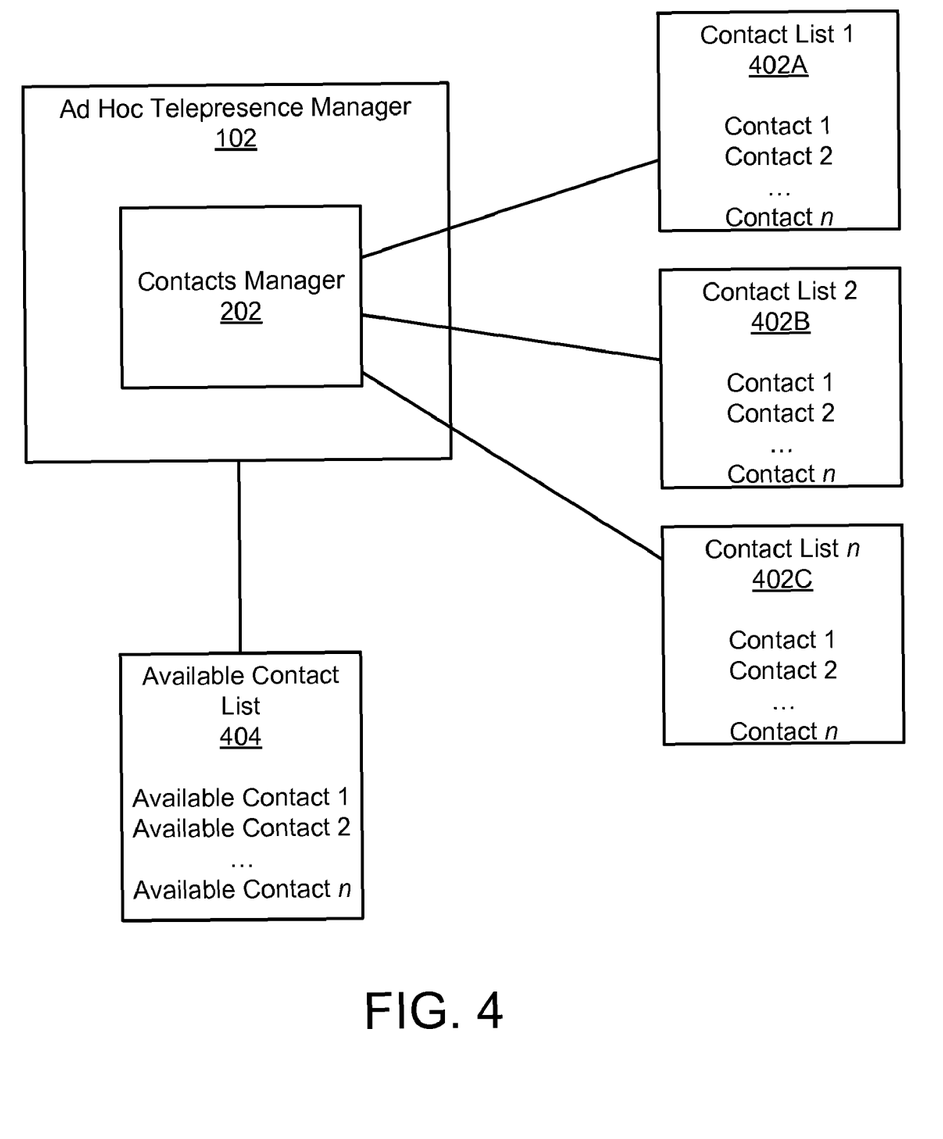
FIG. 4 depicts a schematic diagram of another embodiment of an ad hoc telepresence manager of FIG. 1.

FIG. 4 illustrates a schematic diagram of one embodiment of an ad hoc telepresence manager 102. The ad hoc telepresence manager includes a contacts manager 202. The ad hoc telepresence manager 102 accesses a plurality of contact lists 402A, 402B, 402C and determines the availability of contacts on the contact lists 402A, 402B, 402C to generate an available contact list 404.

More specifically, the contacts manager 202, in the illustrated embodiment, accesses the plurality of contact lists 402A, 402B, and 402C. In one embodiment, the plurality of contact lists 402A, 402B, and 402C is accessed in response to a determination that a user is present in an ad hoc telepresence zone. The plurality of contact lists 402A, 402B, and 402C may be lists of contacts grouped into associated types of contact.

For example, the contact list 402A may be a list of contacts working on a particular project. In another example, the contact list 402B may be a list of managers of the user. In a further example, the contact list 402C may be a list of contacts with which the user has conducted a text chat.

The ad hoc telepresence manager 102, in certain embodiments, determines one or more available contacts from the contact lists 402A, 402B, 402C. In the illustrated embodiment, the ad hoc telepresence manager 102 assembles the available contacts into an available contact list 404. In an alternative embodiment, the ad hoc telepresence manager 102 assembles the available contacts into a list of available contacts 404 for each contact list 402A, 402B, 402C.

Figure 5:
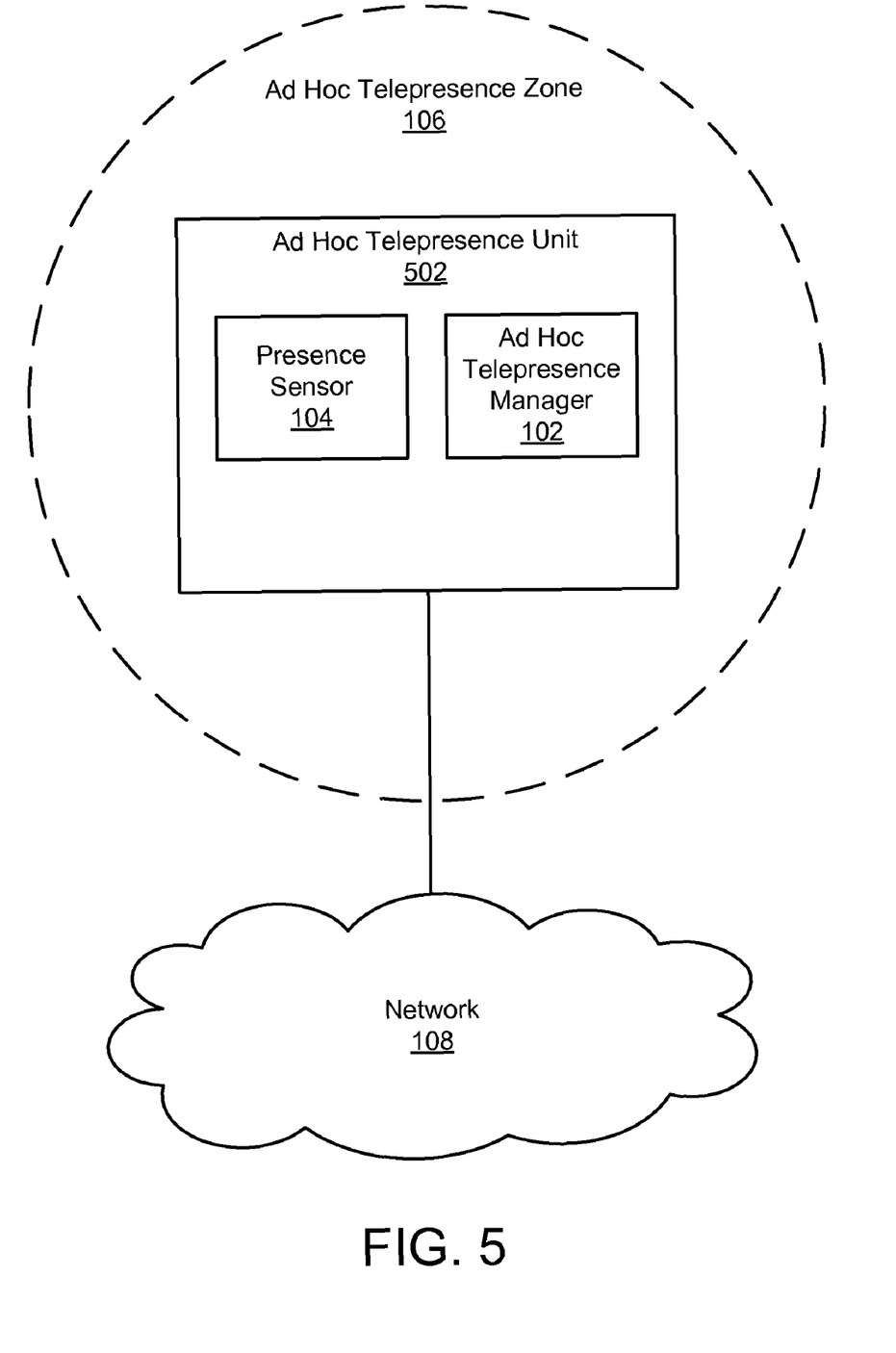
FIG. 5 depicts a schematic diagram of one embodiment of an ad hoc telepresence unit.

FIG. 5 illustrates a schematic diagram of one embodiment of an ad hoc telepresence unit 502. The illustrated ad hoc telepresence unit 502 includes a presence sensor 104 and an ad hoc telepresence manager 102. The ad hoc telepresence unit 502 determines the presence of a user, determines the availability of an associated remote contact, and provides audio and/or video communications to a remote telepresence unit (not shown).

The ad hoc telepresence unit 502, in one embodiment, is hardware and software that provides audio and video communication to a remote telepresence unit. In certain embodiments, the ad hoc telepresence unit 502 includes a video display, speakers, a video camera, and a microphone. The ad hoc telepresence unit 502 connects to a network 108 to connect with the remote telepresence unit. The ad hoc telepresence unit 502, in one embodiment, includes hardware and software for operating the presence sensor 104 and the ad hoc telepresence manager 102.

In an alternative embodiment, the ad hoc telepresence unit 502 is a set top box (STB) that connects to external audio and video devices. For example, the STB may connect to a television, a speaker, a microphone, and a camera. The STB, in one embodiment, includes hardware and software for operating the presence sensor 104 and the ad hoc telepresence manager 102. In an alternative embodiment, the ad hoc telepresence unit 502 is software running on a general purpose computer using external devices such as a camera and/or a microphone.

Figure 6:
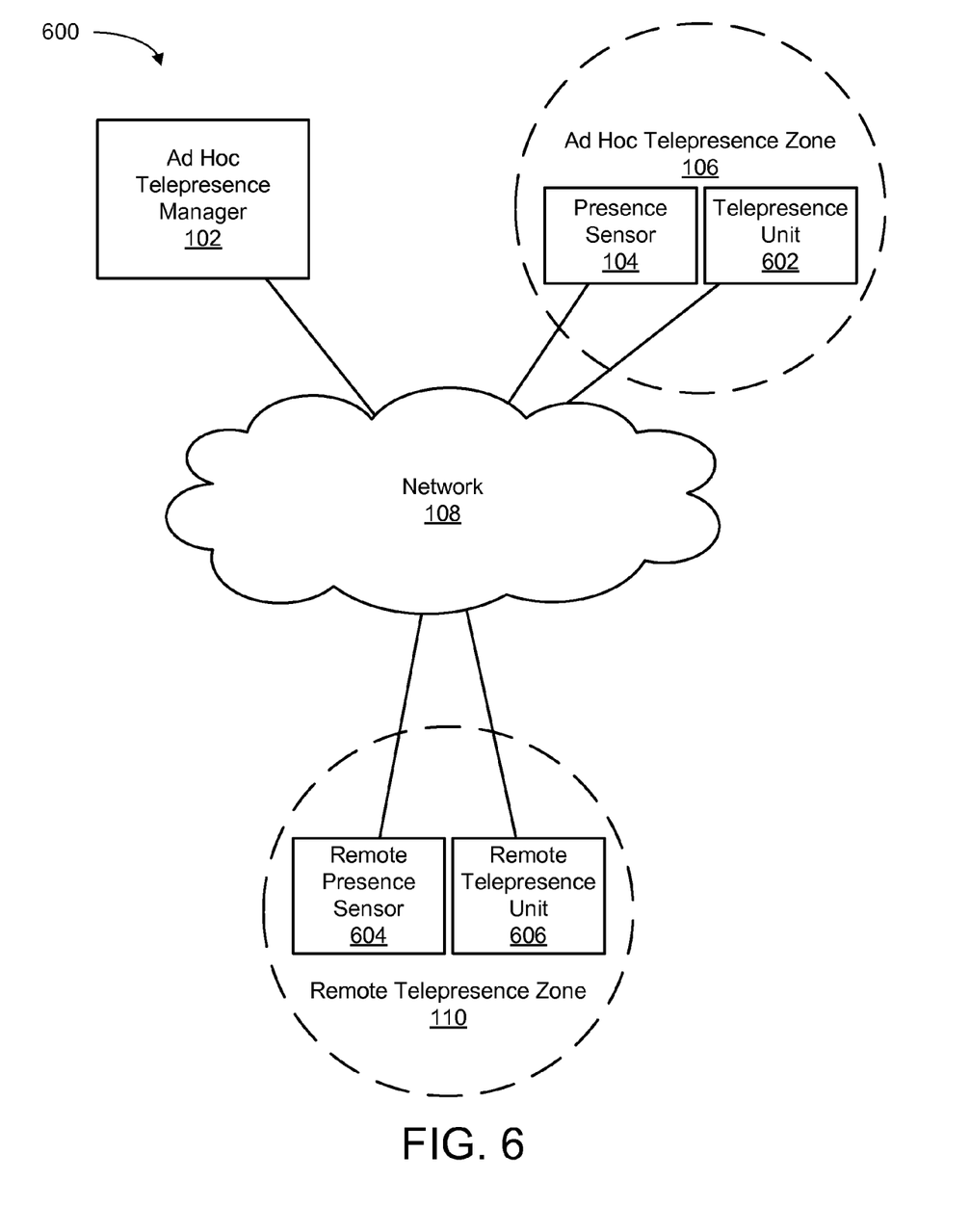
FIG. 6 depicts a schematic diagram of another embodiment of an ad hoc telepresence system.

FIG. 6 is a schematic diagram of another embodiment of an ad hoc telepresence system 600. The illustrated system 600 includes an ad hoc telepresence manager 102, a presence sensor 104, a telepresence unit 602, a remote presence sensor 604, and a remote telepresence unit 606. The ad hoc telepresence manager 102 and the presence sensor 104 are configured in a similar manner to like numbered components described in relation to FIG. 1. Embodiments of the ad hoc telepresence system 600 provide impromptu communication between contacts.

In one embodiment, the telepresence unit 602 is located within an ad hoc telepresence zone 106. The ad hoc telepresence zone 106, in certain embodiments, is defined by a sensing range of the presence sensor 104. The telepresence unit 602, in one embodiment, displays a list of contacts associated with the user that are available for a telepresence session in response to the telepresence zone 106 containing the user.

In one embodiment, the ad hoc telepresence manager 102 determines the availability of a contact by accessing the remote presence sensor 604. The remote presence sensor 604 senses the presence of the contact in a remote telepresence zone 110 in certain embodiments. In response to determining that the contact is present at the remote telepresence zone 110, the ad hoc telepresence manager 102 initiates a telepresence session between the telepresence unit 602 and the remote telepresence unit 606 in one embodiment.

Figure 7:
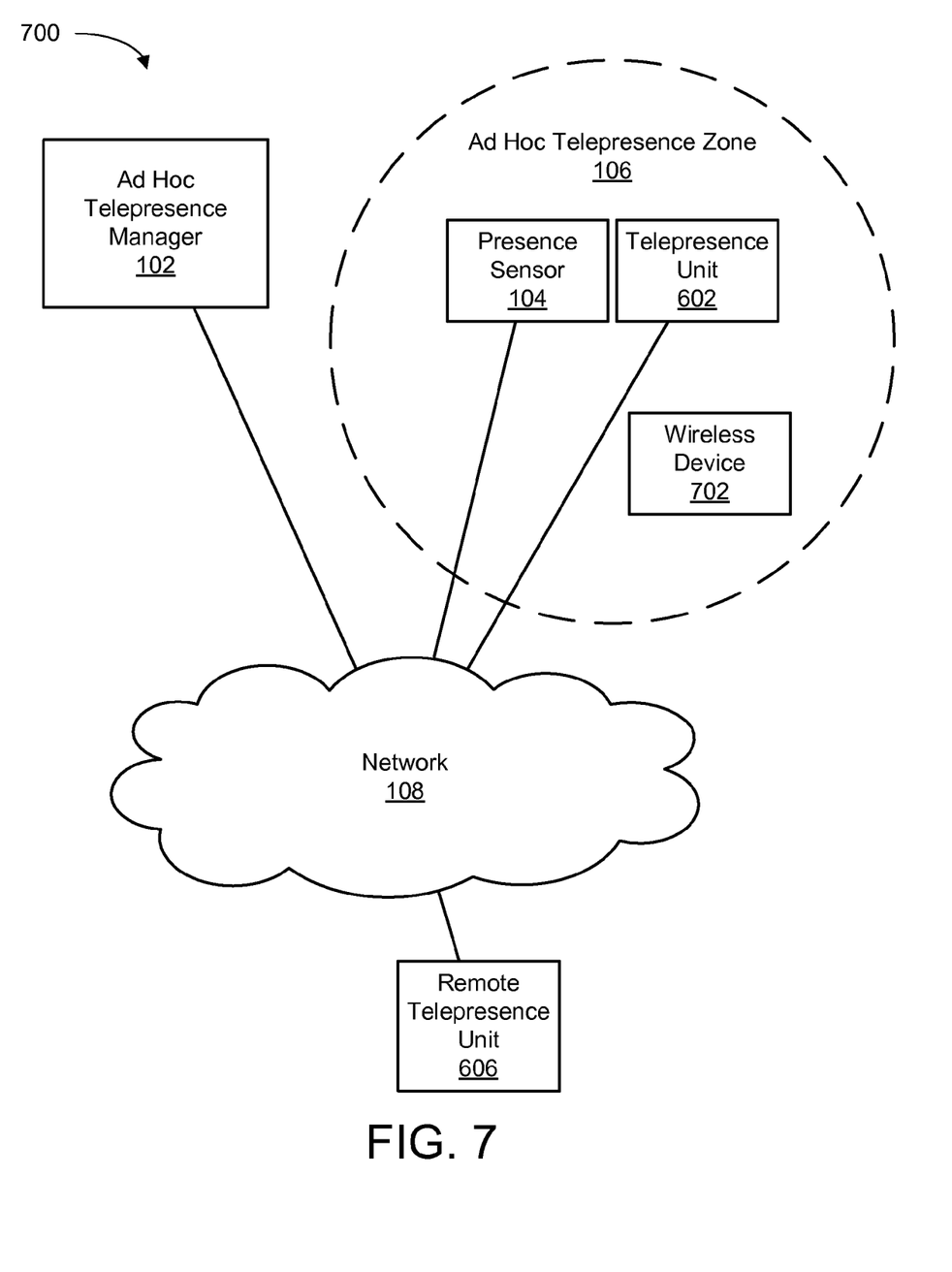
FIG. 7 depicts a schematic diagram of another embodiment of an ad hoc telepresence system.

FIG. 7 is a schematic diagram of another embodiment of an ad hoc telepresence system 700. The illustrated ad hoc telepresence system 700 includes an ad hoc telepresence manager 102, a presence sensor 104, a telepresence unit 602, and a remote telepresence unit 606. The ad hoc telepresence manager 102 and the presence sensor 104 are configured in a similar manner to like numbered components described in relation to FIG. 1. The telepresence unit 602 and the remote telepresence unit 606 are configured in a similar manner to like numbered components described in relation to FIG. 6. Embodiments of the ad hoc telepresence system 700 provide impromptu communication between contacts.

In the illustrated embodiment, the presence sensor 104 detects the presence of the user in the ad hoc telepresence zone 106 in response to the presence within the ad hoc telepresence zone 106 of a wireless device 702 associated with the user. The wireless device 702 may be any type of wireless device capable of communicating presence to the presence sensor 104. Examples of such presence sensors 104 and wireless devices 702 include radio frequency (RF) devices, such as Wi-Fi devices, Bluetooth™ devices, RFID devices, or other wireless devices. Other examples of such presence sensors 104 and wireless devices 702 include infrared (IR) devices and optical recognition devices. In an alternative embodiment, the presence sensor 104 is a facial recognition scanner that matches characteristics of a video image of the user captured by the telepresence device 602 to a database containing information about characteristics of the face of the user.

The telepresence manager 102 determines the availability of a contact at the remote telepresence unit 606 in one embodiment. Availability, in one embodiment, is determined by a sign in status of the contact. For example, the contact may be signed in to a remote computer acting as a remote telepresence unit 606, and the ad hoc telepresence manager 102 may determine that the contact is available as a result of this sign in.

Figure 8:
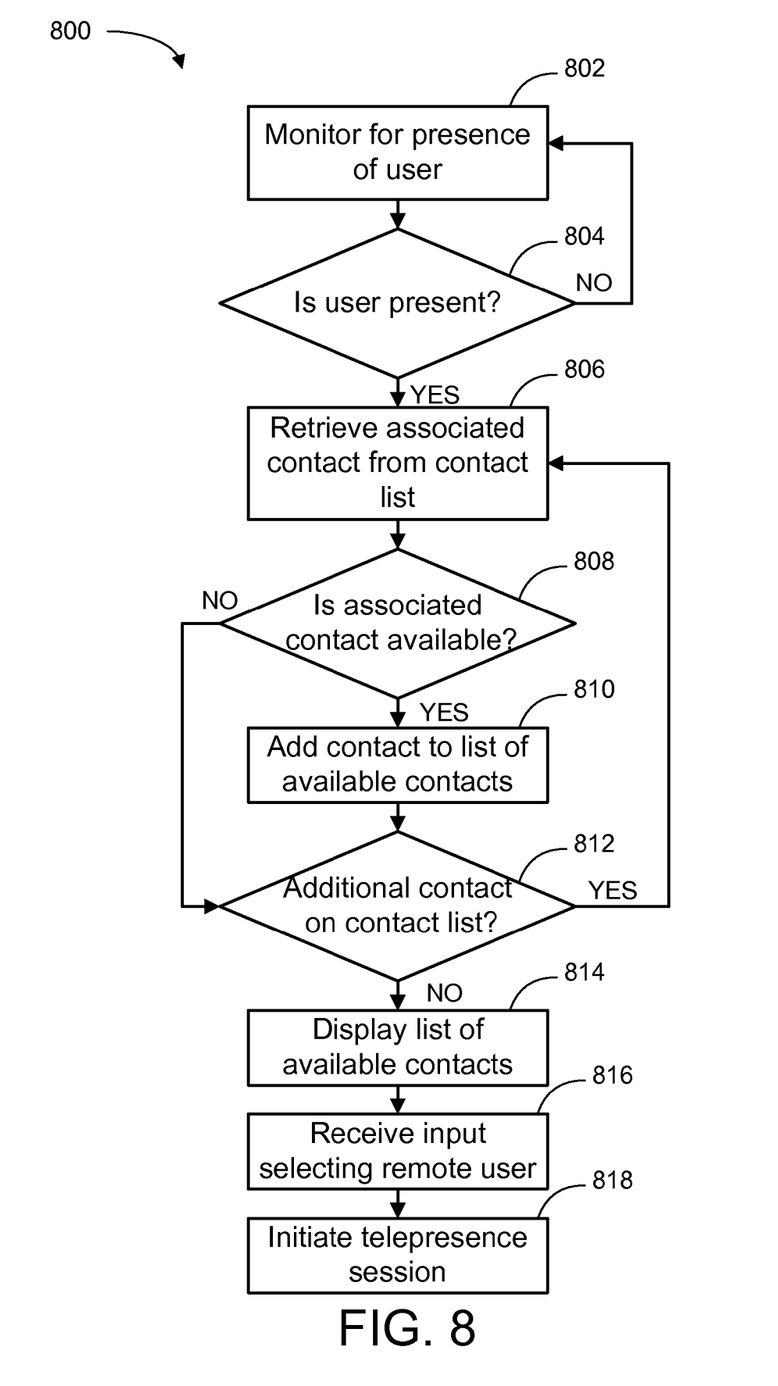
FIG. 8 depicts a flow chart diagram showing one embodiment of a method for managing an ad hoc telepresence session.

FIG. 8 is a flow chart diagram of a method 800 for managing an ad hoc telepresence session. The method 800 is, in certain embodiments, a method of use of the systems and apparatuses of FIGS. 1-7, and will be discussed with reference to those figures. Nevertheless, the method 800 may also be conducted independently thereof and is not intended to be limited to the specific embodiments discussed above with respect to those figures.

As shown in FIG. 8, in certain embodiments, the presence sensor 104 monitors 802 for the presence of a user. The presence sensor 104 may monitor 802 for the presence of the user with any known presence monitoring system, such as an RF transmitter and receiver, IR sensors, optical sensors, facial recognition sensors, or another technology. In certain embodiments, the presence sensor 104 monitors 802 for the presence of a plurality of users. In this embodiment, the presence sensor 104 may detect the presence of more than one user at a given time.

The presence sensor 104 determines 804 the presence of the user in one embodiment. The presence sensor 104 reports the presence of the user to the ad hoc telepresence manager 102 in response to determining 804 that the user is present. If the presence sensor 104 determines 804 that the user is not present, the presence sensor continues to monitor 802 for the presence of the user.

In one embodiment, the ad hoc telepresence manager 102 retrieves 806 a contact list 308 associated with the user in response to receiving a report from the presence sensor 104 that the user is present. The contact list 308 may be stored in a data store 208.

The ad hoc telepresence manager 102, in one embodiment, selects a contact from the contact list 308 and determines 808 if the contact is available for a telepresence session. In certain embodiments, the ad hoc telepresence manager 102 adds 810 the contact to a list of available contacts 404 in response to determining that the contact is available.

In another embodiment, the ad hoc telepresence manager 102 determines 808 that a contact is unavailable based on an input from the contact. For example, a remote user may be present at a remote telepresence zone 110. However, the remote user may access the preferences interface 204 to indicate that the remote user does not wish to be disturbed, and is therefore unavailable. In this example, the ad hoc telepresence manager 102 determines 808 that the remote user is unavailable.

The ad hoc telepresence manager 102 accesses the contact list 308 to determine 812 if an additional contact remains on the contact list 308 in one embodiment. In response to determining 812 that an additional contact exists, the ad hoc telepresence manager 102 returns to retrieve 806 the contact from the contact list 308.

In one embodiment, the list of available contacts 404 is displayed 814 to the user by the ad hoc telepresence manager 102. The list of available contacts 404 is displayed 814 on a telepresence unit 602 in certain embodiments.

The ad hoc telepresence manager 102 receives 816 input from the user selecting a contact for a telepresence session and initiates 818 the telepresence session in one embodiment. In an alternate embodiment, the ad hoc telepresence manager 102 initiates 818 the telepresence session without input from the user.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus to manage ad hoc telepresence sessions, the apparatus comprising:
    a presence sensor to sense a presence of a user in an ad hoc telepresence zone;
    a contacts manager coupled to the presence sensor, the contacts manager to manage a list of contacts associated with the user; and
    an ad hoc telepresence manager coupled to the contacts manager, the ad hoc telepresence manager to:
        determine an availability of a remote user selected from the list of contacts associated with the user; and
        initiate a telepresence session between the user and the remote user in response to determining that the remote user is available.

2. The apparatus of claim 1, further comprising a telepresence unit coupled to the ad hoc telepresence manager, the telepresence unit comprising the presence sensor, a video display, a speaker, a video camera, and a microphone.

3. The apparatus of claim 1, further comprising a set top box (STB) coupled to the ad hoc telepresence manager, the STB comprising the presence sensor, a video output, an audio output, a video input, and an audio input.

4. The apparatus of claim 1, wherein the presence sensor comprises a wireless receiver to receive a notification from a wireless device associated with the user when the wireless device is present in the ad hoc telepresence zone, wherein the presence of the wireless device is indicative of the presence of the user.

5. The apparatus of claim 4, wherein the wireless device comprises a radio frequency identification (RFID) device, and the presence sensor comprises an RFID reader.

6. The apparatus of claim 4, wherein the wireless device comprises a wireless transmitter, and the presence sensor comprises a wireless receiver compatible with the wireless transmitter in the wireless device.

7. The apparatus of claim 1, further comprising a preferences interface to prioritize the list of contacts associated with the user according to an input from the user.

8. The apparatus of claim 1, further comprising a preferences interface to add a contact to the list of contacts associated with the user according to an input from the user.

9. The apparatus of claim 1, further comprising a preferences interface to remove a contact from the list of contacts associated with the user according to an input from the user.

10. The apparatus of claim 1, further comprising a preferences interface to specify that a remote user is unavailable according to an input from the remote user.

11. An apparatus to manage ad hoc telepresence sessions, the apparatus comprising:
    means for sensing a presence of a user in an ad hoc telepresence zone;
    means for managing a list of contacts associated with the user;
    means for determining an availability of a remote user at a remote telepresence zone, the remote user selected from the list of contacts associated with the user; and
    means for initiating a telepresence session between the user and the remote user in response to determining that the remote user is available at the remote telepresence zone.

12. The apparatus of claim 11, further comprising means for conducting a telepresence session in the ad hoc telepresence zone.

13. The apparatus of claim 11, further comprising means for managing a plurality of lists of contacts associated with the user.

14. The apparatus of claim 11, further comprising means for adding a contact to the list of contacts associated with the user in response to an electronic interaction by the user with the contact.

15. The apparatus of claim 14, wherein the electronic interaction with the contact comprises at least one of a telephone conversation, an e-mail, a text chat, or a telepresence session.

16. The apparatus of claim 14, wherein the electronic interaction with the contact comprises an interaction with a document authored by the contact.

17. The apparatus of claim 14, wherein the electronic interaction with the contact comprises an interaction with a computer program code authored by the contact, wherein authorship of the computer program code is extracted from a revision control system.

18. A method to manage ad hoc telepresence sessions, the method comprising:
    sensing a presence of a user in an ad hoc telepresence zone;
    managing a list of contacts associated with the user;
    determining an availability of a remote user at a remote telepresence zone, the remote user selected from the list of contacts associated with the user;
    displaying a list of available remote users; and
    initiating a telepresence session between the user and the remote user according to an input from the user to select the remote user from the list of available remote users.

19. The method of claim 18, further comprising organizing a plurality of contacts associated with the user into a group of contacts.

20. The method of claim 19, further comprising initiating a telepresence session between the user and a subset of the group of contacts in response to determining that at least one contact within the subset of the group of contacts is available.

* * * * *